United States Patent [19]

Tajima et al.

[11] Patent Number: 5,466,642
[45] Date of Patent: Nov. 14, 1995

[54] WEAR RESISTANT CUBIC-BORON-NITRIDE-BASED CUTTING TOOL

[75] Inventors: Itsurou Tajima, Urawa; Fumihiro Ueda, Omiya, both of Japan

[73] Assignee: Mitsubishi Materials Corporation, Tokyo, Japan

[21] Appl. No.: 221,160

[22] Filed: Mar. 31, 1994

[30] Foreign Application Priority Data

Apr. 1, 1993 [JP] Japan ................................ 5-098856

[51] Int. Cl.$^6$ ............................................. C04B 35/5831
[52] U.S. Cl. ................................................ 501/96; 501/87
[58] Field of Search ................................ 501/96, 98, 87

[56] References Cited

U.S. PATENT DOCUMENTS

| | | | |
|---|---|---|---|
| 4,375,517 | 3/1983 | Watanabe et al. | 501/96 X |
| 4,545,968 | 10/1985 | Hirano et al. | 501/96 X |
| 5,041,399 | 8/1991 | Fukaya et al. | 501/96 X |
| 5,326,380 | 7/1994 | Yao et al. | 501/96 X |

*Primary Examiner*—Karl Group
*Attorney, Agent, or Firm*—Vineet Kohli; Thomas R. Morrison

[57] ABSTRACT

A wear resistant C-BN-based cutting tool superior in toughness includes a specified amount of at least one of a Ti carbide/nitride component, a compound including at least one of Ti and Al, tungsten carbide, $Al_2O_3$, and the balance being C-BN and incidental impurities.

8 Claims, No Drawings

5,466,642

WEAR RESISTANT CUBIC-BORON-NITRIDE-BASED CUTTING TOOL

BACKGROUND OF THE INVENTION

The present invention is directed to a cutting tool. More particularly, the present invention is directed to a wear resistant cubic-boron-nitride-based cutting tool (hereinafter referred to as "C-BN based") which can be sintered in an ultra-high-pressure atmosphere.

A cutting tool formed from the C-BN based material of the present invention exhibits improved toughness and superior wear. Such a cutting tool is also longer lasting and resistant to damage such as chipping and breaking of the cutting edge while in continuous and discontinuous use. In recent years, a demand for factory automation has created a need for high speed cutting tools that can be utilized for cutting spherical graphite, cast iron and similar products. As such, the cutting tools are required to be longer lasting, tougher and more wear resistant.

Prior art C-BN based cutting tools are plagued by numerous drawbacks. Chief among them is their inability to continuously cut spheroidal graphite caste iron in an industrial setting. Notwithstanding the toughness of prior art cutting tools, such cutting tools are prone to breakage and chipping of their cutting edges while continuously cutting iron. This drawback, in turn, impairs their usefulness and substantially shortens their lifespan.

The shortened life span, in turn, increases the overall cost of using prior art C-BN based cutting tools in both the cost of replacement of cutting tools and the cost of machine downtime and labor required to replace worn tools.

OBJECTS AND SUMMARY OF THE INVENTION

Accordingly, it is an object of the present invention to provide a wear resistant cubic-boron-nitride-based cutting tool which exhibits superior toughness and improved wear resistance of the cutting edge when compared to prior art C-BN based cutting tools.

It is still a further object of the present invention to provide a wear resistant cubic-boron-nitride-based cutting tool which is longer lasting.

It is still a further object of the present invention to provide a wear resistant cubic-boron-nitride-based cutting tool which exhibits improved resistance to chipping and breaking of the cutting edge while continuously cutting steel.

Briefly stated, the present invention provides a wear resistant cutting tool superior in toughness which includes a specified amount of at least one of a Ti carbide/nitride component, a compound including at least one of Ti and Al, tungsten carbide, $Al_2O_3$, and the balance being C-BN and incidental impurities.

According to an embodiment of the present invention, there is provided a wear-resistant cutting tool made of a cubic-boron-nitride-based material (C-BN-based) which includes, in weight percent, from about 10 to about 40 percent of at least one of a carbide, nitride, and carbon nitride of Ti; from about 5 to about 25 percent of a compound including at least one of Ti and Al; from about 0.5 to about 2 percent of tungsten carbide; from about 2 to about 10 percent of $Al_2O_3$; and a balance composed of C-BN and incidental impurities.

According to a feature of the present invention, there is provided a wear resistant cutting tool made of a cubic-boron-nitride-based material (C-BN-based) which includes, in weight percent, from about 20 to about 40 percent of at least one of a carbide, nitride, and carbon nitride of Ti, from about 0.1 to about 2 percent of a tungsten carbide, wherein the tungsten carbide has a grain size of no more than 1 µm; from about 1 to about 5 percent of a Al nitride; from about 3 to about 7 percent of Ti boride; from about 5 to about 15 percent of $Al_2O_3$; and the balance composed of C-BN and incidental impurities.

The above, and other objects, features and advantages of the present invention will become apparent from the following description.

DETAILED DESCRIPTION OF THE PREFERRED EMBODIMENTS

The inventors have discovered that a C-BN based ultra-high-pressure-sintered material composed of, in weight percent, from about 10 to about 40% of at least one element selected from the group consisting of carbide, nitride and carbon nitride of Ti (hereinafter referred to as TiC, TiN and TiCN respectively, and generally referred to as "Ti carbide/nitride), from about 5 to about 25% of at least one of Ti and Al (herein after referred to as Ti—Al compound), from about 2 to about 10% of Aluminum Oxide (hereinafter referred to as $Al_2O_3$), from about 0.1 to about 2% of tungsten carbide (hereinafter referred to as WC) and the balance being C-BN and incidental impurities, provides superior cutting tools.

The present inventors have discovered that a composition including a combination of the aforementioned elements substantially improves the wear resistance and toughness of a C-BN based cutting tool. The improvements in wear resistance and toughness are due to grain size refinement and grain growth suppression imparted by at least one of $Al_2O_3$ and WC.

The grain size of the Ti carbide/nitride component together with that of the Ti—Al compound, the WC compound and $Al_2O_3$ is restricted to a predetermined size. The predetermined size is 1 µm, more preferably no greater than 0.5 µm.

The grain size of C-BN is also restricted to a size not exceeding 4 µm. This restriction on the grain size allows the grain size of C-BN to be maintained at the same size as it was before being added to the mixture.

This restriction, in turn, allows the cutting tool to maintain superior wear resistance and improved toughness, such that it resists breakage or chipping of the tool even when used continuously over a substantial period of time.

The preferred C-BN based ultra-high-pressure-sintered material for fabricating the C-BN based cutting tool of the present invention exhibiting superior toughness and wear resistance, is composed of the following elements.

Ti carbide/nitride

The Ti carbide/nitride is added to improve the overall toughness of the cutting tool. It is preferred that Ti carbide/nitride be present in an amount, in weight percent, from about 10 to about 40 wt % (all percentages hereinafter referred to are in weight terms unless otherwise stated). More preferably, the Ti carbide/nitride content should range from about 20 to about 40% of the total composition.

When present in an amount less than 10%, Ti carbide/nitride is unable to impart sufficient toughness to the cutting tool of the present invention. Alternatively, when the amount of Ti carbide/nitride exceeds 40%, Ti carbide/nitride makes the cutting tool less strong and less wear resistant. In an amount exceeding 40%, the Ti carbide/nitride component also reduces resistance of the cutting tool to plastic deformation, a drawback associated with the presence of C-BN.

Ti—Al compound

This component is added to the cutting tool material with a view towards assisting in sintering of the material. In light of its assisting capabilities, this component is imparts superior strength to the cutting tool material. The Ti—Al compound includes at least one of $TiAl_3$, $TiAl$, $Al_2Ti$, $AlTi_2$, $AlTi_3$ and similar compounds. The Ti—Al compound decomposes to produce at least one of Ti boride and Al nitride.

The amount of Ti—Al ranges from about 5 to about 25%. When the total amount of Ti—Al is less than 5%, the cutting tool material and resulting cutting tool is not sufficiently strong and wear resistant. On the other hand, when the total amount of Ti—Al exceeds 25%, a larger amount of Ti boride and Al nitride is generated. The resulting increase in the amount of Ti boride and Al nitride substantially decreases the overall wear resistance of the C-BN based cutting tool.

The amount of Ti boride ranges from about 3 to about 7%, while the amount of Al nitride ranges from about 1 to about 5%.

$Al_2O_3$ and WC

These components, when present in the C-BN based ultra-high-pressure-sintered cutting tool material, restrict the grain size of Ti carbide/nitride components and suppress the grain growth of C-BN particles, while simultaneously maintaining its own grain size. It acts similarly to a catalyst wherein it prevents its own grain size from growing while suppressing the grain growth of the C-Bn particles and restricting the grain size of the Ti carbide/nitride components.

The ability of $Al_2O_3$ to maintain its own grain size while simultaneously suppressing grain growth of other elements contributes to an improvement in the resistance to wear and breakage of the cutting tool.

The amount of $Al_2O_3$ preferably ranges from about 2 to about 15%. When present in an amount less than about 2%, $Al_2O_3$ fails to impart sufficient wear resistance and toughness to the cutting tool material. Alternatively, if the amount of $Al_2O_3$ exceeds about 15%, $Al_2O_3$ reduces the crystalline property of the C-BN based cutting tool material. This, in turn, drastically reduces the overall strength and wear resistance of the cutting tool. It is preferable that the amount of $Al_2O_3$ be from about 2 to about 10%.

The wear resistant C-BN based cutting tool contains from about 0.1 to about 2% of WC. Similar to $Al_2O_3$, WC suppresses grain growth of the C-BN component, and restricts the grain size of the Ti carbide/nitride components while maintaining its own grain growth at an optimal size.

When present in an amount less than about 0.1%, WC fails to impart sufficient wear resistance and toughness to the C-BN based cutting tool. Alternatively, if the amount of WC exceeds about 2%, WC reduces the crystalline property of the C-BN based cutting tool material. This, in turn, drastically reduces the overall strength and wear resistance of the cutting tool.

C-BN

This component is added to the cutting tool material in order to ensure superior wear resistance of the C-BN based cutting tool. Wear resistance and plastic deformation resistance can be further improved by maintaining the amount of C-BN to not less than 35% of the total cutting tool material.

Examples embodying the C-BN based ultra-high-pressure-sintering material according to the present invention are described hereinafter.

EXAMPLE 1

Following powder materials were prepared:

(a) Ti carbide/nitride powders with grain sizes ranging from 0.5 to about 1 μm, (b) Ti—Al compound powders with grain sizes ranging from 0.3 to about 0.5 μm, (c) $Al_2O_3$ powder materials with grain sizes ranging from 0.2 to about 0.5 μm, (d) WC powder materials with grain sizes ranging from 0.3 to about 0.5 μm, and (e) C-BN material powders with varying compositions and grain sizes, as shown in Tables 1 and 2.

Each of the various material powders containing numerous particles of varying grain sizes were wet blended by a ball mill over a 72-hour period, as shown in Tables 1 and 2. After drying, the blended compositions were compression formed under a pressure of 3 ton/cm$^2$ to provide compressed green bodies, each having a diameter of 20 mmØ and a thickness of at least 1.5 mm.

The thus obtained, compacted green bodies were then vacuum sintered. In this procedure, the compacted green bodies were maintained for thirty minutes at a predetermined temperature ranging between 1000° and 1300° C. in a vacuum of $3 \times 10^{-4}$ torr.

The resulting sintered compacted green bodies were superimposed on WC-based cemented carbide substrates. The cemented carbide substrates measured 20 mmØ in diameter and 2 mm in thickness. The superimposed compacted green bodies, were then sintered a second time. In this procedure, the superimposed compacted green bodies were maintained for thirty minutes at a predetermined temperature ranging between 1000° and 1300° C. in a pressure atmosphere of 5 GPa.

The resulting compacted green bodies were then wire cut into four pieces, and brazed to the WC-based cemented carbide substrates.

The resulting materials were then polished to a predetermined size, producing samples in accordance with Example 1 through 9 of the cutting tool according to the present invention, whose composition is shown in Table 1.

Additionally, sample Nos. 1 to 9, representing prior art C-BN based cutting tools (hereinafter referred to as "comparative sample nos"), were also obtained, whose composition is shown in Table 2. The conventional cutting inserts were characterized by the deletion of at least one component present in the samples of the present invention.

The grain size of each component of the C-BN based ultra-high-pressure-sintered material and the resulting cutting tool was measured.

These samples (cutting tools) were simultaneously subjected to a wet-type cast-iron continuous cutting test and a discontinuous cutting test which are described as follows:

Discontinuous cutting test included the following:

Cut material: Round bar of spheroidal graphite cast iron (JIS, FCD70) having four longitudinal grooves, which was cut at three points equally spaced in a longitudinal direction.

Cutting speed: 250 m/min

Feed per revolution: 0.2 mm/rev

Infeed: 0.2 mm

Cutting time: 60 minutes

Continuous cutting test included the following:

Cut material: Round bar of spheroidal graphite cast iron (JIS, FCD70).

Cutting speed: 400 m/min

Feed per revolution: 0.2 mm/rev

Infeed (depth of cut): 0.25 mm

Cutting time: 30 minutes

The width of flank wear of the cutting edge on each sample was measured after completion of each of the abovementioned tests. The results are reported in Tables 3.

Sample Nos. 1–9 represent cutting tools of the present invention.

It is clear from Tables 1–3 that sample Nos. 1–9 did not undergo any damage, such as breakage or chipping of the cutting edge during both continuous and discontinuous use.

On the other hand, comparative sample nos 1–9, exhibited inferior wear resistance and easily broke during continuous and discontinuous use.

TABLE 3

| | Width of flank wear land (mm) | |
|---|---|---|
| No. | Continuous cutting | Intermittent cutting |
| Present Invention | | |
| 1 | 0.15 | 0.15 |
| 2 | 0.13 | 0.16 |
| 3 | 0.14 | 0.21 |
| 4 | 0.17 | 0.19 |
| 5 | 0.15 | 0.16 |
| 6 | 0.14 | 0.21 |
| 7 | 0.16 | 0.22 |
| 8 | 0.18 | 0.21 |
| 9 | 0.16 | 0.22 |
| Comparative Examples | | |
| 1 | 0.45 | Chipping occurred in 25 min. |
| 2 | 0.52 | Breakage occurred in 6 min. |
| 3 | 0.28 | 0.42 |
| 4 | 0.39 | Breakage occurred in 20 min. |
| 5 | 0.42 | 0.43 |
| 6 | 0.40 | Chipping occurred in 11 min. |
| 7 | 0.40 | Breakage occurred in 7 min. |
| 8 | 0.45 | Chipping occurred in 10 min. |
| 9 | 0.48 | Breakage occurred in 2 min. |

TABLE 1

| | Composition (wt %) | | | | | | |
|---|---|---|---|---|---|---|---|
| | | | | | C-BN | | |
| No. | Ti Carbide/Nitride | Ti—Al Compound | $Al_2O_3$ | WC | Grain Size (μm) | | |
| Present Invention | | | | | | | |
| 1 | TiC:20 | $TiAl_3$:15 | 4 | 0.8 | 1–3 | Remainder |
| 2 | TiN:26 | $TiAl_3$:15 | 5 | 0.5 | 0.5–1.5 | Remainder |
| 3 | TiCN:22 | $Ti_3Al$:8, TiAl:3 | 8 | 0.8 | 2–4 | Remainder |
| 4 | TiC:18, TiN:25 | TiAl:15 | 4 | 0.5 | 1–3 | Remainder |
| 5 | TiC:15, TiCN:10 | $Ti_3Al$:10, $TiAl_3$:5 | 4 | 0.5 | 1–3 | Remainder |
| 6 | TiN:20, TiCN:9 | $Ti_3Al$:23 | 5 | 0.2 | 2–4 | Remainder |
| 7 | TiN:15, TiN:10 TiCN:10 | $TiAl_3$:10 | 2 | 1.0 | 1–3 | Remainder |
| 8 | TiC:10 | TiAl:5, $TiAl_3$:5, $Ti_3Al$:2.5 | 4 | 1.6 | 3–4 | Remainder |
| 9 | TiC:20, TiN:15 | TiAl:5 | 3 | 2.0 | 3–4 | Remainder |

TABLE 2

| | Composition (wt %) | | | | | |
|---|---|---|---|---|---|---|
| | | | | | C-BN | |
| No. | Ti Carbide/Nitride | Ti—Al Compound | $Al_2O_3$ | WC | Grain Size (μm) | |
| Comparative Examples | | | | | | |
| 1 | TiC:5 ✗ | $Ti_3Al$:20 | 5 | 2 | 2–4 | Remainder |
| 2 | TiCN:5 ✗ | TiAl:10, $TiAl_3$:10 | 5 | — ✗ | 3–4 | Remainder |
| 3 | TiN:50 ✗ | $TiAl_3$:10 | 5 | 1 | 4–7 | Remainder |
| 4 | TiN:31 | TiAl:2 ✗ | 5 | 2 | 3–6 | Remainder |
| 5 | TiC:20 | TiAl:30 ✗ | 4 | 1 | 3–6 | Remainder |
| 6 | TiC:20 | $TiAl_3$:4 | — ✗ | 1 | 2–4 | Remainder |
| 7 | TiC:10, TiN:5 | $TiAl_3$:6 | 13 ✗ | 1 | 3–4 | Remainder |
| 8 | TiC:20, TiCN:8 | TiAl:10 | 2 | — ✗ | 2–4 | Remainder |
| 9 | TiC:25 | $Ti_3Al$:5, TiAl:5, $TiAl_3$:5 | 5 | 5 ✗ | 2–4 | Remainder |

(✗: Outside the range of the present invention)

It seems clear that in sample Nos. 1–9, the grain sizes of the C-BN components ranged from about 1 to 4 μm, while the grain size of the remaining components ranged from about 0.2 to about 0.5 μm.

Further, grain growth was observed in the cutting tool of comparative sample Nos. 6 and 8. Comparative sample 6 was composed of a C-BN based ultra-high-pressure sintered material which did not contain $Al_2O_3$, while comparative sample 8 was composed of a C-BN based ultra-high-pressure sintered material which lacked WC.

In these respective cutting tools (comparative sample Nos. 6 and 8), the C-BN grain size ranged from about 3 to about 6 μm while the grain sized of the remaining components ranged from about 4 to about 8 μm.

In Table 2 "*" indicates that the component was either missing from the C-BN based ultra-high-pressure-sintered material or its content exceeded that of the C-BN based cutting tool material of the present invention.

The above results lend credence to the notion that a C-BN-based cutting tool composed of a C-BN based ultra-high-pressure-sintered material is superior in toughness and wear resistance when compared to comparative sample Nos. 1–9. The comparative sample Nos. 1–9 are composed of a C-BN based ultra-high-pressure-sintered material which either lacks at least one component ordinarily present in the C-BN based ultra-high-pressure-sintered material of present invention or its content is outside the scope of the cutting tool material of the present invention.

Based upon the foregoing, the C-BN based cutting tool composed of a C-BN based ultra-high-pressure-sintered material of the present invention excels both in wear resistance and toughness. The C-BN based cutting tool exhibits improved resistance to wear and tear damage such as breakage and/or chipping of the cutting edge when in continuous and discontinuous use.

These features, in turn, impart excellent cutting properties to the cutting insert and substantially increase its life expectancy.

Having described preferred embodiments of the present invention, it is to be understood that the invention is not limited to those precise embodiments, and that various changes and modifications may be effected by one skilled in the art without departing from the scope or spirit of the invention as defined in the appended claims.

What is claimed:

1. A wear-resistant cutting tool made of a cubic-boron-nitride-based material (C-BN-based) comprising, in weight percent:

from about 10 to about 40 percent of at least one of a carbide, nitride, and carbon nitride of Ti;

from about 5 to about 25 percent of a compound including at least one of Ti and Al;

from about 0.5 to about 2 percent of tungsten carbide;

from about 2 to about 10 percent of $Al_2O_3$; and a balance being C-BN and incidental impurities.

2. The cutting tool of claim 1, wherein said tungsten carbide has an average grain size of at most 1 μm.

3. The cutting tool of claim 1, wherein said at least one of Ti and Al has an average grain size of at most 1 μm.

4. The cutting tool of claim 1, wherein said at least one of Ti and Al has an average grain size of at least 0.5 μm.

5. The cutting tool of claim 1, wherein the content of said C-BN, in weight percent, is at least 35 percent.

6. The cutting tool of claim 1, wherein said C-BN has a grain size of at least 4 μm.

7. A cutting tool comprising, in weight percent:

from about 20 to about 40 percent of at least one of a carbide, nitride, and carbon nitride of Ti;

from about 0.1 to about 2 percent of tungsten carbide;

said tungsten carbide has a grain size of no more than 1 μm;

from about 1 to about 5 percent of Al nitride;

from about 3 to about 7 percent of Ti boride;

from about 5 to about 15 percent of $Al_2O_3$; and a balance being C-BN and incidental impurities.

8. The cutting tool of claim 7, wherein the said tungsten carbide has a grain size of at least 0.5 μm.

* * * * *